March 28, 1944.     R. MARTIN     2,344,947
DRAFT REGULATOR
Filed July 17, 1942     2 Sheets-Sheet 1

INVENTOR
Russell Martin
BY Arthur P. Brown
ATTORNEY

March 28, 1944.  R. MARTIN  2,344,947
DRAFT REGULATOR
Filed July 17, 1942  2 Sheets-Sheet 2
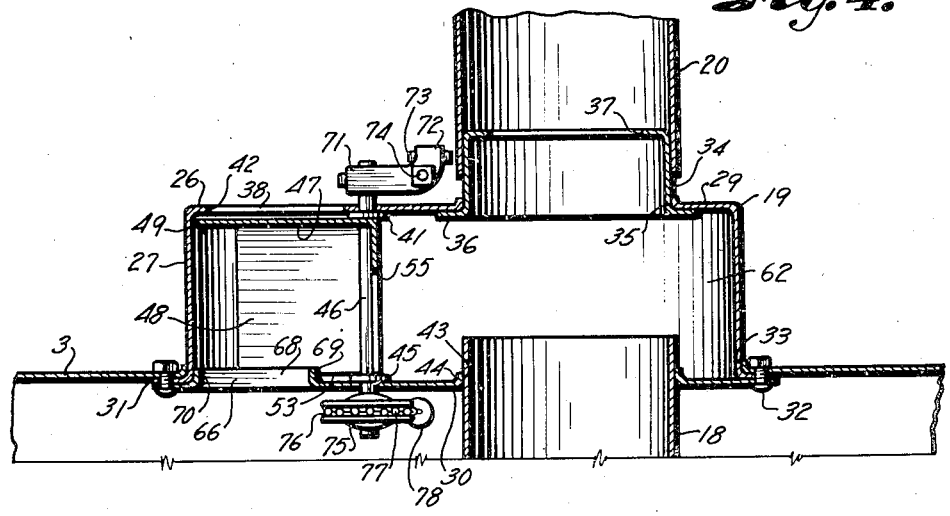
INVENTOR
Russell Martin.
BY
ATTORNEY Patented Mar. 28, 1944

2,344,947

UNITED STATES PATENT OFFICE 2,344,947

DRAFT REGULATOR

Russell Martin, Wichita, Kans., assignor to The Coleman Lamp and Stove Company, Wichita, Kans., a corporation of Kansas Application July 17, 1942, Serial No. 451,257

13 Claims. (Cl. 236—45)

This invention relates to draft regulators particularly for heating appliances such as furnaces, space heaters, and the like, wherein it is desirable to maintain a substantially constant pressure differential between the interior and exterior of the heating unit of the appliance for a predetermined firing rate.

Draft regulators when actuated responsive to fluctuating flue and variable external pressures do not operate in a satisfactory manner, particularly when used on heating equipment located in drafty locations. For example, floor furnaces are located under the floor of a building and under floor temperatures and pressures vary to a great extent for the reason such buildings have no basements and the foundations are usually poorly constructed so that the under floor space is extremely drafty, and regulators subject to such drafty conditions cannot operate with any degree of accuracy. I have overcome this difficulty by providing a draft regulator whereby the combustion chamber pressure is balanced by the relatively constant pressure of the air within the furnace jacket. This is the heated air that is withdrawn from the space being heated and circulated in contact with the heating surfaces of the furnace. As the temperature of the air remains substantially constant, the pressures do not fluctuate and can be depended upon to effect substantially accurate operation of a draft regulator.

Such a regulator is disclosed in my copending application Serial No. 417,491, filed November 1, 1941.

A device of this character operates with substantial accuracy but the air admitted into the chimney is heated air and the use of heated air results in loss of heat since the heated air taken from the space being heated must be replaced by infiltration of cold outside air.

It is, therefore, a principal object of the invention to provide a draft regulator operated by the differential in pressure between the room air and the interior of the combustion chamber for admitting cold air from outside of the space being heated into the chimney, the advantage being that the outside unheated air costs nothing while air from within the space being heated has cost an expenditure of fuel.

Other objects of the invention are to provide a draft regulator assembled as a unit so that it may be readily installed in a heating appliance and particularly floor furnaces; to provide a draft regulator with all moving parts thereof located outside the flow of products of combustion passing from the heating appliance into the chimney; and to provide a draft regulator constructed for establishing a predetermined uniform torque on the movable vane which responds to the interior and exterior pressures of the heating unit, thereby maintaining a predetermined constant differential or draft at the burner of the appliance.

In accomplishing these and other objects of the invention, as hereinafter pointed out, I have provided a structure, the preferred form of which is illustrated in the accompanying drawings, wherein:

Fig. 4 is a horizontal section through the draft regulator on the line 4—4 of Fig. 2.

Fig. 5 is a perspective view of the parts of the draft regulator shown in disassembled spaced relation.

Figure 1:
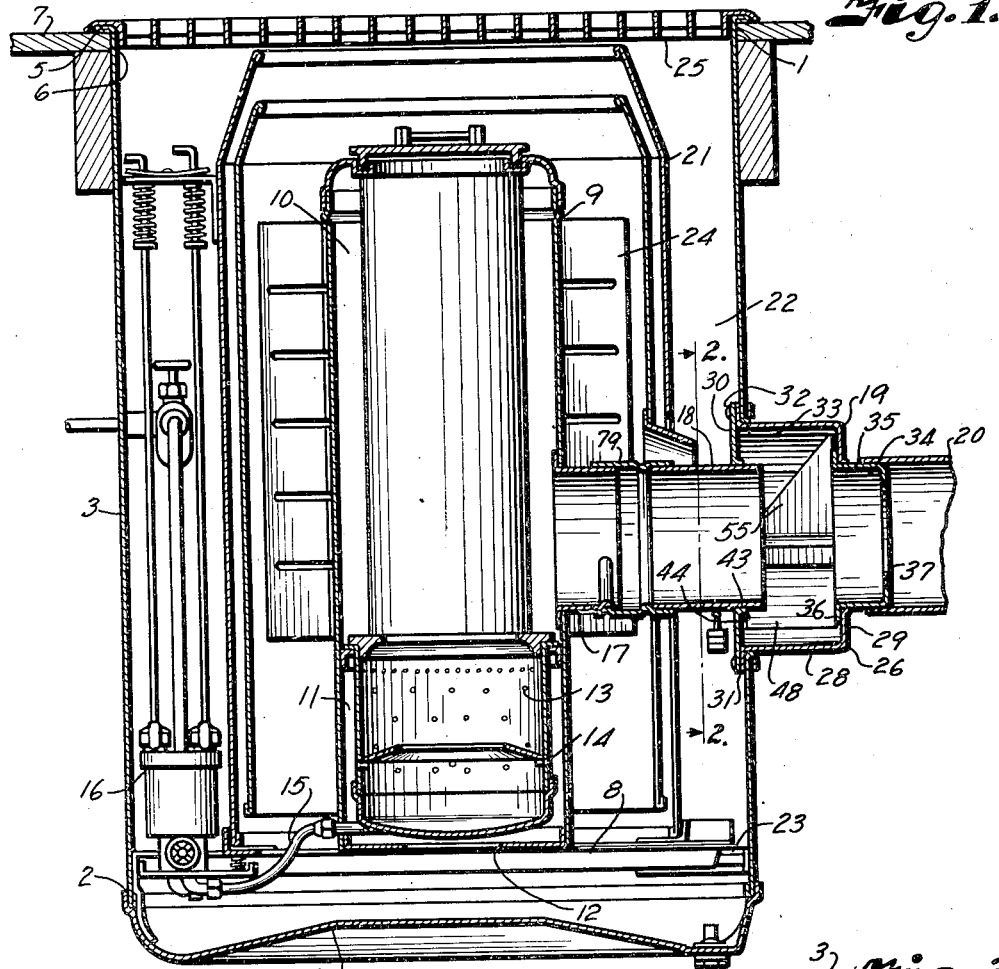
Fig. 1 is a vertical section through a floor furnace equipped with a draft regulator constructed in accordance with the present invention.

Referring more in detail to the drawings:

While the present invention is adapted to various forms of heating appliances I have particularly illustrated it in connection with a floor furnace 1 which includes an outer casing 2 having side walls 3 and a bottom 4. The top of the casing is open and the upper edges of the side walls are provided with laterally extending flanges 5 whereby the casing is suspended within an opening 6 of a floor 7. Suitably supported within the casing on a frame 8 is a heating unit assembly 9 including a combustion chamber 10 and a burner chamber 11 having an air inlet opening 12 in the bottom thereof for passing combustion supporting air through perforations 13 in the wall of a burner pot 14 that is suspendingly supported within the chamber 11 in such a manner that the chamber 11 is closed from the interior of the combustion chamber. Fuel is supplied to the burner pot through a pipe 15 under control of a fuel metering valve 16 as in usual practice.

The wall of the combustion chamber is provided with a flue collar 17 having detachable connection with a thimble 18 extending through the adjacent wall 3 of the outer casing 2 to connect through a draft regulator 19 with a pipe 20 leading to a chimney (not shown). The heater unit is surrounded by an inner casing or jacket 21 spaced from the walls of the outer casing to provide downflow passageways 22 which are connected at their lower ends, as at 23, with upflow passageways 24 surrounding the heater unit. The open top of the casing is covered by a floor grill 25 as in customary floor furnace construction.

In operation, air from the space above the floor 7 is drawn downwardly through the grill 25, through the passageways 22, and through the opening 12 into the burner pot 14 and through the perforations 13, responsive to pressure differential effected by the chimney. The air supports combustion of the fuel to heat the walls of the combustion chamber and cause upward movement of heated air through the passageways 24 and grill 25 into the space being heated. In order to maintain efficient combustion, the air should be drawn into the burner pot at constant rate for a given rate of fuel feed to the pot, the rate of input to the burner being controlled by the draft regulator. However, the differential pressure between the exterior and interior of the heater unit would vary with the temperature of the chimney, exterior weather conditions, gusts of wind blowing across the chimney and the like so that air supplied to the burner would vary in amount if it were not for the draft regulator 19, now to be described.

The draft regulator 19 includes a substantially pan-shaped elongated casing 26, having rounded ends 27 merging into side walls 28 to which are connected a back wall 29 and a removable front plate 30, the plate 30 being attached to a laterally extending marginal flange 31 of the walls 27 and 28 by fastening devices, such as bolts 32, which may mount the draft regulator within an opening 33 of the outer casing 2 as later described.

The back wall 29 is provided at one end thereof in coaxial alignment with the thimble 18 with a collar 34 over which the pipe 20 is sleeved as best illustrated in Fig. 4. The collar 34 is preferably a separate part and is projected through an opening 35 formed in the back 29 and has a flange 36 abutting the inner face thereof and which is secured by suitable fastening means such as spot welding or the like. The outer end of the collar is preferably provided with an internally extending flange 37 to form a restricted passageway therethrough. The opposite end of the back 29 has a substantially sector-shaped opening 38, the side edges 39 and 40 of which radiate from the axis of a bearing 41 mounted as shown in Fig. 5. The edges 39 and 40 are included by an arcuate edge 42 spaced slightly from the adjacent curved end of the draft regulator casing 26. The opening 38 is preferably located above the horizontal diameter of the casing and forms an air inlet whereby relatively cold air is taken from the exterior of the space being heated by the furnace, for example from the space below the floor 7 or from exteriorly of the building by connecting a suitable pipe therewith. The plate 30 has a circular opening 43 provided with an inwardly extending flange 44 registering with the collar 34 and which passes the outer end of the thimble 18.

By controlling the port area of the opening 38, pressure may be controlled within the heater unit so that if the chimney draft is constant a uniform pressure differential may be maintained between the interior and exterior of the heating unit and a desired amount of air suitable for supporting efficient combustion of the fuel is supplied to the burner pot, but owing to the fact that the chimney draft varies according to weather conditions, it is necessary to control automatically the amount of air admitted through the opening 38 responsive to internal and external pressure differential as effected by the chimney so that a predetermined differential may be maintained regardless of variation caused by the chimney. In the end of the plate 30 opposite the bearing 41 there is a coaxial bearing 45 to cooperate therewith in mounting the ends of a shaft 46. The shaft 46 carries a segmental disk-like shutter 47 adapted to swing in valving relation with the opening 38 responsive to oscillation of the shaft 46 incidental to pressure differential acting on the respective sides of a vane 48. The segmental disk-like shutter 47 has a radius so that the arcuate edge 49 thereof moves in overlapping relation with the arcuate edge 42 of the opening 38 and the segment is of sufficient size to close the opening completely and provide lapping of the radial edges 50 and 51 thereof with the radial edges 39 and 40 of the opening.

The vane 48 is fixed tangentially on the shaft and has one side edge 52 attached to the radial edge 50 of the shutter 47 and is of sufficient width so that the opposite side edge 53 is arranged to move in substantially close contact with the inner face of the plate 30. The outer end of the vane terminates in a flange-like lip 54 which moves in substantially close relation with one of the rounded portions 27 of the casing 26. In order to brace the vane and shutter structure, the shutter is connected with the vane by a substantially triangular-shaped web 55.

Supported within the casing of the regulator is a partition member 56 comprising a sheet metal plate bridging the space from the shaft 46 to the adjacent rounded end of the casing where it is connected therewith by providing the partition with a flange 57 that is suitably secured to the casing by spot welding or the like. The partition is so positioned that one edge 58 thereof substantially registers with the edge 39 of the opening 38 but spaced therefrom, as at 59, to accommodate the shutter 47. The opposite edge of the partition is provided with a flange 60 similar to the flange 57, the flange 60 abutting against the inner face of the plate 30 and secured thereto by a fastening device such as a bolt 61. The partition member thus cooperates with the vane 48 to divide the interior of the draft casing into separate chambers 62 and 63, the chamber 62 being connected with the chimney and interior of the combustion chamber so that the pressure therein is that effected by the chimney draft which pressure acts upon face 64 of the vane 48. In order that the opposite face 65 of the vane may be acted upon by pressure externally of the heater unit, the cover plate 30 is provided with a segmental-shaped opening 66 having the edges thereof provided with inwardly extending radial flanges 67—68 and inner and outer arcuate flanges 69—70, the outer flange 70 engaging the rounded end of the casing and the radial flange 67 the partition 56. Therefore, air pressure interiorly of the furnace casing but exteriorly of the heating unit is admitted into the chamber 63 to act on the face 65 of the vane while pressure within the heating unit acts on the face 64 of the vane, consequently the vane is subject to movement responsive to variation in the respective pressures acting thereon so that the shutter is moved to and from covering relation with the opening 38 for regulating the amount of air admitted into the draft regulator for eliminating the chimney draft.

In order to provide a balanced structure the end of the shaft projecting through the bearing 41 is provided with a balancing arm 71 terminating in a laterally extending end 72, which end is provided with radially arranged and transversely extending balance adjusting screws 73 and 74 respectively. In order that a predetermined pressure differential may be maintained, the opposite end of the shaft or that within the furnace casing is provided with a pulley 75 which is fixed thereto and has a grooved periphery 76 carrying a flexible endless belt, such as an endless chain 77. The chain 77 is attached in fixed relation to the pulley so that it depends equally from opposite diametrical sides thereof and exerts equal torque in opposite directions so that the chain has no effect upon movement of the vane. One side of the chain is then used as a carrier for attaching a weight 78 to produce a torque to balance the desired pressure differential at the vane. When the vane responds to variation in pressure differential the weight is merely raised or lowered by the chain so that the torque produced thereby is constant, therefore any variation from the predetermined pressure differential set by the weight will be corrected by the movement of the shutter controlling the air inlet valve since this shutter is actuated by the movable vane.

It is obvious that means for varying the mechanical torque for different firing rates may be used, one method being disclosed in my copending application, Serial No. 407,156, filed August 16, 1941.

Figure 2:
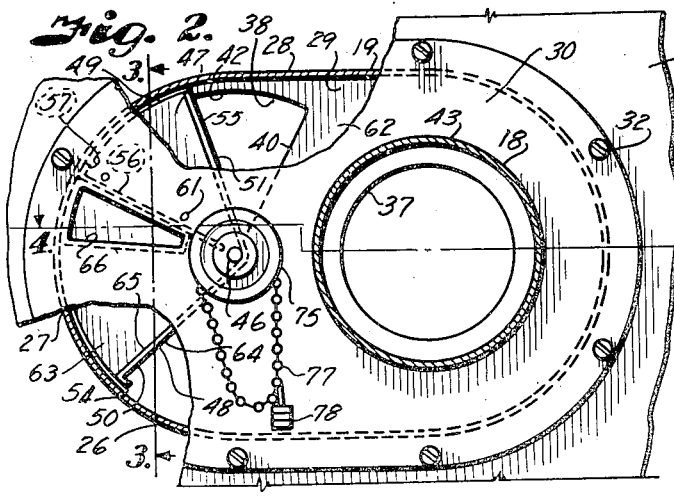
Fig. 2 is a fragmentary section on the line 2—2 of Fig. 1 showing the front of the draft regulator with parts thereof broken away to better illustrate the construction thereof.
Figure 3:
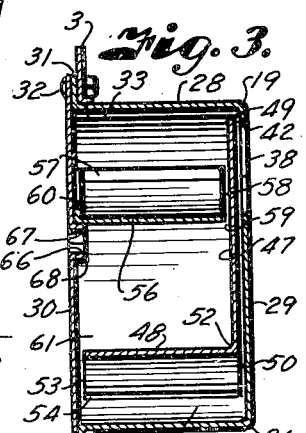
Fig. 3 is a vertical section on the line 3—3 of Fig. 2.

The draft effected by the chimney acts within the chamber 62 of the regulator reducing the pressure therein so that air from the interior of the outer casing is drawn into the burner chamber and into the burner pot through the perforations thereof to promote combustion of the fuel and effect withdrawal of the products of combustion through the thimble 19 to the pipe 20. The draft produced by the chimney lowers the pressure on the face 64 of vane 48. The higher pressure of air in the outer casing, which is that of the space being heated, is exerted on the opposing face 65 of the vane. This differential in pressures causes the vane to move in an anticlockwise direction whenever this differential exceeds the predetermined differential balanced by the opposing weight 78. If the differential of the pressures acting on the vane is less than the predetermined differential, balanced by the weight, the movement would be clockwise (Fig. 2). These movements of the vane actuate the air shutter 47 which by admitting air into the chimney controls the draft of same to that required by the appliance. Thus, the draft regulator may be set so that a predetermined draft differential may be maintained between the interior and exterior of the heating unit. This is effected by applying a proper weight 78 to the chain depending from the clockwise side of the pulley, Fig. 2. The weight tends to close the shutter, but the reduced pressure effected by the chimney and acting with the pressure external of the heating unit tends to open the shutter so as to admit sufficient air to maintain the predetermined differential pressure of the interior and exterior of the heating unit. Since the actuating force controlling the regulating valve is merely the differential of substantially static pressures on opposite sides of the movable vane, which vane is not subject to the force of kinetic energy produced by rapid air flow through the regulator as is the case with regulators most commonly used, the regulator of this invention is more accurate in its regulation. Since the air is admitted from outside of the space being heated, the air is relatively cooler than the air moving through the chimney when the heating appliance is in operation. Consequently the cooler air rapidly reduces the draft with a relatively small amount of air being admitted.

It is obvious that since the air is admitted from the outside of the space being heated, there is no loss of heated air through the regulator with the result that the efficiency of the heating appliance is increased since there is no cold air filtering into the space being heated to take the place of warm air which is ordinarily used in controlling the draft. Therefore a heating appliance equipped with a draft regulator in accordance with the present invention produces a high heating efficiency and a greater accuracy of draft control is effected, as compared with other methods commonly used.

It is also obvious that since all the moving parts of the regulator are outside of the flow of products of combustion from the heating unit, they do not become coated with soot and the like that would interfere with accuracy and trouble free operation.

While I have particularly illustrated and described the invention as applied to a floor furnace, it is obvious that it is adaptable to any form of space heater by connecting the air inlet for reducing chimney draft with the exterior of the space being heated by means of a pipe or the like without departing from the spirit of the invention.

What I claim and desire to secure by Letters Patent is:

1. In a heating appliance including a heating unit provided with a combustion chamber having an outlet for connection with a chimney to establish a pressure differential between the interior and exterior of said combustion chamber, a draft regulator connected with said outlet, a pressure responsive actuator in the draft regulator having one side subject to the pressure within the combustion chamber of the heating unit and the other side subject to pressure of air that is to be heated by said unit and arranged to move responsive to variation in differential of said pressures, means for admitting air to the draft regulator from outside space heated by said appliance, and means connecting the actuator with said air admitting means for regulating admission of air in controlling said pressure differential.

2. In a heating appliance including a heating unit provided with a combustion chamber having an outlet for connection with a chimney to establish a pressure differential between the interior and exterior of said combustion chamber, a draft regulator connected with said outlet, a pressure responsive actuator in the draft regulator having one side subject to said pressure within the combustion chamber and another side subject to pressure of air that is to be heated by the unit, means supporting said actuator for movement responsive to variation in differential of the pressures acting on said actuator, means for admitting air to the draft regulator from outside space heated by the appliance, means connecting the actuator with said air admitting means for regulating admission of air in controlling said pressure differential, and means connected with the actuator for selectively maintaining a predetermined pressure differential.

3. In a heating appliance including a heating unit provided with a combustion chamber having an outlet for spent products of combustion, vent means connected with said outlet to establish a pressure differential between the interior and exterior of said heating unit, a draft regulator connected with said outlet, an actuator in the draft regulator having one side subject to the pressure within the combustion chamber and another side subject to pressure of air that is to be heated by said unit and adapted to move responsive to variation in differential of said pressures, means for admitting air from outside the space heated to the draft regulator, and means connecting the actuator with said air admitting means for regulating admission of air in controlling said pressure differential.

4. In a heating appliance including a casing, a heating unit in the casing spaced from walls of the casing to provide an air circulating space and having an outlet for connection with a venting means to establish a pressure differential between the interior and exterior of said heating unit, said air circulating space being adapted for passing air to be heated, a draft regulator connected with said outlet, an actuator in the draft regulator having one side subject to pressure within said air circulating space and another side subject to pressure within said outlet and adapted to move responsive to variation in differential of said pressure, means for admitting air to the venting means from a source exteriorly of the space being heated by said appliance, and means connecting the actuator with said air admitting means for regulating admission of air in controlling said pressure differential.

5. In a heating appliance including a casing, a heating unit in the casing spaced from walls of the casing to provide an air circulating space and having an outlet for connection with a chimney to establish a pressure differential between the interior of said heating unit and space in said casing, a draft regulator connected with said outlet, said air circulating space being adapted for passing air to be heated by said appliance, an actuator in the draft regulator having one side subject to pressure within the air circulating space and another side subject to pressure within said outlet and adapted to move responsive to variation in differential of said pressures, means for admitting air to the chimney from a source exteriorly of the casing, means connecting the actuator with said air admitting means for regulating admission of air in controlling said pressure differential, and means connected with the actuator for selectively maintaining a predetermined pressure differential.

6. In a heating unit having a combustion chamber and provided with an outlet for spent products of combustion and adapted for connection with a chimney to establish a pressure differential between the interior of the combustion chamber and the space being heated, a draft regulator connected with said outlet having an actuator located out of the path of the spent products of combustion discharged from the outlet and having one side subject to said combustion chamber pressure and another side subject to pressure of air that is to be heated by said unit and adapted to move responsive to variation in differential of said pressures, means for admitting air to the draft regulator from a source outside the space heated by said unit, and means connecting the actuator with said air admitting means for regulating admission of air in controlling said pressure differential.

7. A draft regulator including, a casing having an inlet adapted for connection with the interior of a heating unit and having an outlet adapted for connection with a chimney for establishing a pressure differential between the interior and exterior of the heating unit, a vane having oscillatory support in said casing, a partition member cooperating with the vane for dividing the casing into separate pressure chambers, one subject to pressure in said outlet and the other having an opening to admit air to be heated by the heating unit to which the draft regulator is connected whereby said vane is movable responsive to variation of pressure differential of the chambers, and means connected with the vane and movable thereby for admitting exterior air into the regulator for maintaining a predetermined pressure differential between the chambers.

8. A draft regulator including, a casing having openings adapted for connection with the interior of a heating unit and with a chimney respectively, a shaft pivotally supported in the casing, a vane on the shaft, a partition member cooperating with the vane to divide the casing into separate pressure chambers, one subject to pressure established through said openings and the other having an opening to admit air to be heated by the heating unit, said casing having an air inlet to the chamber subject to the pressure established through said openings, and a shutter member carried by the shaft and movable by the vane over the air inlet for controlling admission of exterior air to the chamber.

9. A draft regulator including, a casing having an inlet adapted for connection with the interior of a heating unit and having an outlet for connection with a chimney for establishing a pressure differential between the interior and exterior of said unit, a shaft pivotally supported in the casing, a vane on the shaft, a partition member cooperating with the vane to divide the casing into separate pressure chambers, one subject to internal pressure of the heating appliance and the other to pressure in the space that is to be heated by said unit, said casing having an air inlet to the chamber subject to the internal pressure and a separate inlet opening to the chamber subject to pressure in the space heated, a shutter carried by the shaft and movable by the vane over the inlet for controlling said inlet of air to the chamber subject to the interior pressure, balance means on the shaft including, a pulley on the shaft, a flexible member operating over the pulley and depending therefrom, and a weight carried by said flexible member for effecting a predetermined torque on said shaft.

10. A draft regulator including, an elongated casing having openings in opposite sides at the respective ends thereof, a shaft pivotally supported transversely in the casing, a vane on the shaft, a partition member cooperating with the vane to divide the casing into separate pressure chambers, one connected with the openings at one end of the casing and with one of the openings at the opposite end of the casing and the other connected with the remaining opening, and a segmental disk carried by the shaft and movable over one of the openings of the chamber having the three openings.

11. A draft regulator including, an elongated casing having openings in opposite sides at the respective ends thereof, a shaft pivotally supported transversely in the casing, a vane on the shaft, a partition member cooperating with the vane to divide the casing into separate pressure chambers, one connected with the openings at one end of the casing and with one of the openings at the opposite end of the casing and the other connected with the remaining opening, a segmental disk carried by the shaft and movable over one of the openings of the chamber having the three openings, and means for applying a predetermined torque on said shaft.

12. A draft regulator including, an elongated casing having openings in opposite sides at the respective ends thereof, a shaft pivotally supported transversely in the casing, a vane on the shaft, a partition member cooperating with the vane to divide the casing into separate pressure chambers, one connected with the openings at one end of the casing and with one of the openings at the opposite end of the casing and the other connected with the remaining opening, a segmental disk carried by the shaft and movable over one of the openings of the chamber having the three openings, balance means on the shaft including, a pulley on the shaft, a flexible member operating over the pulley, and a weight carried by said flexible member for applying a predetermined torque on the shaft.

13. In a floor furnace including a casing adapted for suspension through an opening in the floor of a room to be heated, a heating unit supported in said casing and provided with a combustion chamber having an outlet for spent products of combustion, said outlet being adapted for connection with a chimney whereby the chimney establishes a differential between the interior and exterior of the heating unit when the furnace is installed, a draft regulator connected with said outlet, an actuator in the draft regulator having one side subject to pressure within the combustion chamber by way of said outlet and having another side subject to pressure of air circulated through said casing, said actuator being adapted to move responsive to variation in differential of said pressures, means for admitting air to the draft regulator at a point below the floor, and means connecting the actuator with said air admitting means for regulating admission of air to said outlet.

RUSSELL MARTIN.